(12) United States Patent
Christy et al.

(10) Patent No.: US 9,169,147 B2
(45) Date of Patent: Oct. 27, 2015

(54) PRECISION LIME STABILIZATION SYSTEM AND METHOD FOR TREATMENT OF SEWAGE SLUDGE

(71) Applicants: Richard W. Christy, Eagleville, PA (US); Michael Quici, Ambler, PA (US); Stephen H. Yost, Warminster, PA (US)

(72) Inventors: Richard W. Christy, Eagleville, PA (US); Michael Quici, Ambler, PA (US); Stephen H. Yost, Warminster, PA (US)

(73) Assignee: RDP Technologies, Inc., Conshohocken, PA (US)

( * ) Notice: Subject to any disclaimer, the term of this patent is extended or adjusted under 35 U.S.C. 154(b) by 188 days.

(21) Appl. No.: 14/048,345

(22) Filed: Oct. 8, 2013

(65) Prior Publication Data

US 2014/0175026 A1    Jun. 26, 2014

Related U.S. Application Data (63) Continuation-in-part of application No. 13/302,312, filed on Nov. 22, 2011.

(51) Int. Cl.
| | |
|---|---|
| *F26B 21/00* | (2006.01) |
| *C02F 11/14* | (2006.01) |
| *C02F 1/52* | (2006.01) |
| *C02F 1/66* | (2006.01) |
| *C02F 11/18* | (2006.01) |

(52) U.S. Cl.
CPC ............... *C02F 11/14* (2013.01); *C02F 1/529* (2013.01); *C02F 1/66* (2013.01); *C02F 11/18* (2013.01); *C02F 11/185* (2013.01)

(58) Field of Classification Search
CPC .............. F26B 3/00; F26B 7/00; F26B 19/00; F26B 21/00; C02F 1/529; C02F 11/14

USPC ............ 34/380, 381, 168, 172, 173; 210/709, 210/88, 96.1
See application file for complete search history.

(56) References Cited

U.S. PATENT DOCUMENTS

| | | |
|---|---|---|
| 2,904,401 A | 9/1959 | Booth |
| 3,969,094 A | 7/1976 | Dunson, Jr. et al. |
| 4,064,744 A | 12/1977 | Kistler |
| 4,166,997 A | 9/1979 | Kistler |
| 4,261,953 A | 4/1981 | Gisler |
| 4,454,770 A | 6/1984 | Kistler |
| 4,482,528 A | 11/1984 | Emmett |
| 4,539,024 A | 9/1985 | Stehning et al. |
| 4,588,559 A | 5/1986 | Emmett |
| 5,013,458 A | 5/1991 | Christy, Sr. et al. |

(Continued)

FOREIGN PATENT DOCUMENTS

| | | | | |
|---|---|---|---|---|
| WO | WO 9636570 A1 | * 11/1996 | ............... | C02F 11/18 |
| WO | WO 2006113176 A2 | * 10/2006 | ............... | C04B 2/04 |
| WO | WO 2008045857 A2 | * 4/2008 | ............... | F26B 11/16 |

*Primary Examiner* — Stephen M Gravini
(74) *Attorney, Agent, or Firm* — Paul & Paul (57) ABSTRACT

A lime stabilization system for treatment of sewage sludge, and method is provided in which dewatered sludge and lime are provided to a mixer. Lime and sludge are mixed to raise the pH during which volatiles are driven off with or without supplemental heat. A forced air draft prevents steam from backing up into the lime supply. The sludge goes to a discharge station via a transfer apparatus, and air containing any dust, odors, steam or ammonia is cleaned via a scrubber. The system is computer-controlled via gravimetric load cells and/or volumetric means. The system includes computer controlled means for dissolving scale resulting from exposure of surfaces to lime, using acid, water or combinations thereof.

19 Claims, 5 Drawing Sheets

(56) References Cited

U.S. PATENT DOCUMENTS

| | | | |
|---|---|---|---|
| 5,217,625 A * | 6/1993 | Khan et al. | 210/761 |
| 5,229,011 A | 7/1993 | Christy, Sr. et al. | |
| 5,292,353 A | 3/1994 | Kaufman et al. | |
| 5,313,022 A | 5/1994 | Piroozmandi et al. | |
| 5,336,481 A | 8/1994 | Muzik et al. | |
| 5,346,616 A | 9/1994 | Christy, Sr. et al. | |
| 5,368,731 A | 11/1994 | Pesotini | |
| 5,401,402 A | 3/1995 | Christy et al. | |
| 5,405,536 A | 4/1995 | Christy | |
| 5,433,844 A | 7/1995 | Christy | |
| 5,554,279 A | 9/1996 | Christy | |
| 5,573,656 A * | 11/1996 | Santos | 208/13 |
| 5,618,442 A | 4/1997 | Christy | |
| 5,746,983 A | 5/1998 | Stephansen | |
| 5,770,823 A | 6/1998 | Piroozmandi | |
| 5,783,073 A | 7/1998 | Christy et al. | |
| 6,092,301 A * | 7/2000 | Komanowsky | 34/263 |
| 6,568,842 B1 | 5/2003 | Murray | |
| 7,024,800 B2 * | 4/2006 | Gorbell et al. | 34/576 |
| 7,048,900 B2 * | 5/2006 | Mathur et al. | 423/331 |
| 7,416,673 B2 | 8/2008 | Christy et al. | |
| 7,669,348 B2 * | 3/2010 | Christy et al. | 34/361 |
| 7,685,737 B2 * | 3/2010 | Gorbell et al. | 34/86 |
| 8,065,815 B2 | 11/2011 | Christy et al. | |
| 2006/0231507 A1 | 10/2006 | Christy et al. | |
| 2006/0231511 A1 | 10/2006 | Christy et al. | |
| 2007/0056902 A1 * | 3/2007 | Kelly | 210/609 |
| 2007/0281059 A1 * | 12/2007 | Smith | 426/311 |
| 2008/0057555 A1 * | 3/2008 | Nguyen | 435/165 |
| 2008/0185324 A1 | 8/2008 | Christy et al. | |
| 2011/0039318 A1 * | 2/2011 | Lehr | 435/161 |
| 2014/0034582 A1 * | 2/2014 | Christy et al. | 210/709 |
| 2014/0175026 A1 * | 6/2014 | Christy et al. | 210/764 |

* cited by examiner

PRECISION LIME STABILIZATION SYSTEM AND METHOD FOR TREATMENT OF SEWAGE SLUDGE

CROSS-REFERENCE TO RELATED APPLICATIONS

This is a continuation-in-part of U.S. patent application Ser. No. 13/302,312 filed Nov. 22, 2011, the complete disclosure of which is herein incorporated by reference.

FIELD OF THE INVENTION

The present invention relates to apparatus and process for treatment of sewage sludge (also known as biosolids), and a process thereof.

BACKGROUND OF THE INVENTION

The need for treating sewage sludge for disposal, and particularly municipal sewage sludge, has increased substantially in recent years. One way of dosing so, is by mixing or blending alkaline materials with the sludge. There is also developing an increasing demand, particularly with respect to municipal sewage sludge, that the treatment of the sludge be sufficiently thorough that is will allow beneficial re-use of sludge, such as enabling the sludge to be applied to land on which agricultural and ornamental corps may be grown. One way of doing so is to mix alkaline products with sludge in a manner that blends the alkaline and sludge.

When sewage sludge is only treated with an alkaline material such as lime, without a sufficient increase in sludge temperature, the resulting mix may be only partially stabilized, such that higher pathogenic organisms are not destroyed.

In the treatment of sewage sludge, such can produce dust as a result of the treatment process and odors, and steam can result from the temperature reached during the treatment process. Additionally, ammonia can be produced during the treatment process.

Additionally, the use of lime during the treatment process can results in build-up of scale resultant from the lime treatment on surfaces that are exposed to the lime treatment.

SUMMARY OF THE INVENTION

The present invention is directed to a precision lime stabilization system and method for the treatment of sewage sludge, which can be automatically controlled via a computer, which results in a clean system that substantially reduces the discharge to atmosphere of dust, odors, steam and ammonia, whereby clean air is delivered to the atmosphere from the system. The system is essentially an enclosed system in which the lime and sludge are mixed to raise the pH thereof to a range of about 10 to about 12.5. The system is also controlled preferably by controlling the weight of sludge and lime that are delivered to a mixer, via weight measurement from load cells, which weights are transmitted to a computer, which controls various other functions of the system. Alternatively, the control of sewage sludge delivered into the system can be the result of volumetric control.

The system also allows for various means of providing heat to the mix of sewage sludge and lime, for example, to volatize compounds.

A control hood for capturing odors, steam, dust and ammonia as a result of the treatment is provided, for delivering the same to a wet scrubber and stack, for discharge to atmosphere.

The thus treated sewage sludge/lime mix is discharged from the system via a substantially enclosed conveyor after withdrawal of the dust, odors, steam and any ammonia as a result of the treatment process.

The resultant treated mix can then be discharged to be applied to land, as may be desired.

DETAILED DESCRIPTION OF THE PREFERRED EMBODIMENTS

Figure 1:
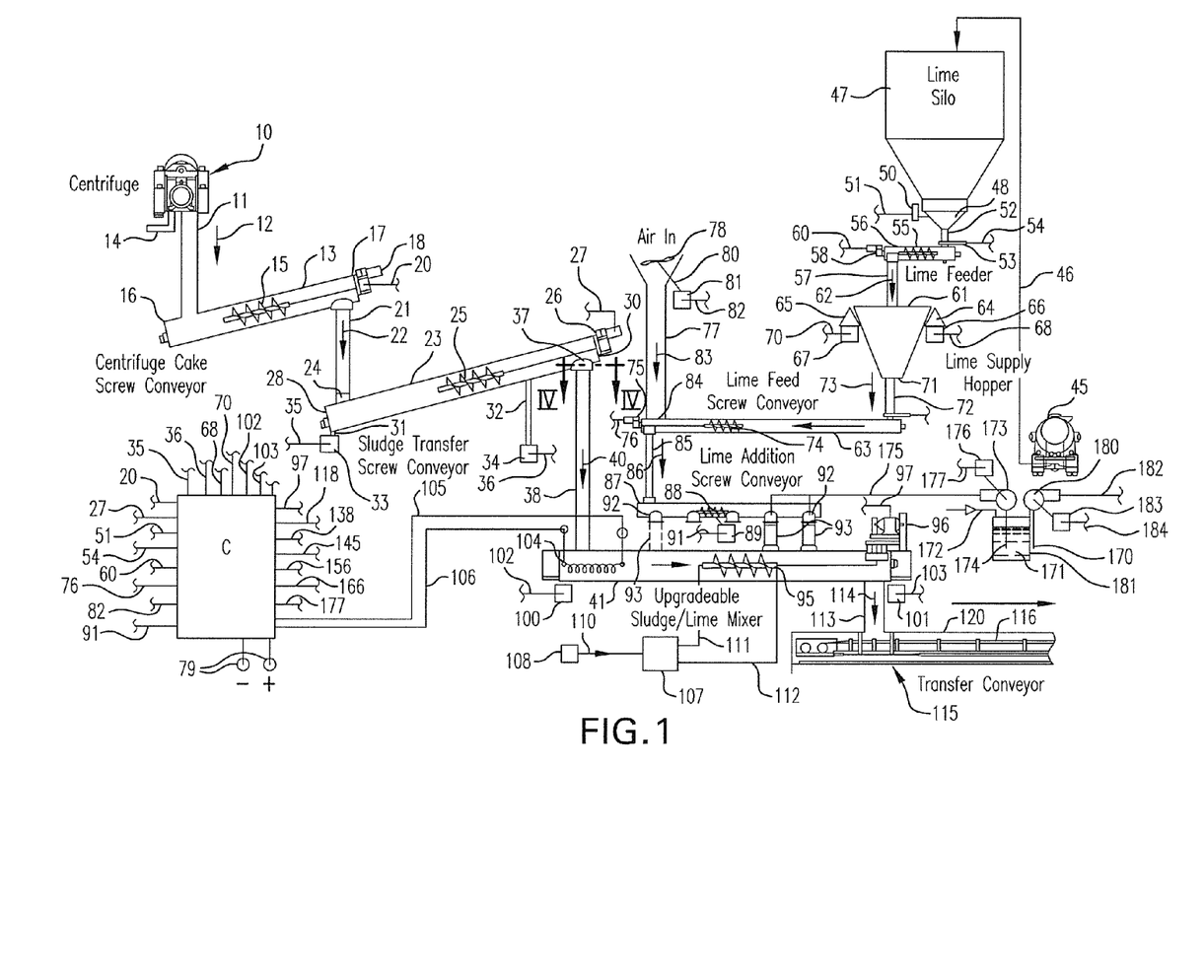
FIG. 1 is a schematic illustration of a treatment system of this invention, from a dewatering device, through a sewage sludge delivery system to a sludge/lime mixer, and a lime supply to the sludge/lime mixer, to a substantially enclosed transfer conveyor.

Referring now in detail to the drawings, wherein like reference numeral indicate like elements throughout the several views, there is shown in FIG. 1 a dewatering device 10 in the form of a centrifuge. It will be understood that any suitable dewatering device or solids concentration device may be used in place of the centrifuge. The device 10 delivers sewage sludge via the line 11, in the direction of the arrow 12 to a centrifuge cake screw conveyor 13. A discharge line 14 is provided from the centrifuge or other dewatering device, for delivery of water that is removed from the sewage sludge, to discharge.

The screw conveyor 13 is provided with an auger 15 therein, schematically shown as illustrated. It will be understood that where an auger such as that 15 is illustrated in the drawings, only partially occupying the conveyor device, such is only a schematic illustration, and that the auger (or other belt or other conveyor mechanisms within the conveyor) will, in fact, exist from one end of the conveyor to the other, such as from end 16 to opposite end 17.

The auger 15 is controlled via a motor 18 that provides for auger rotation, via a control line 20, that is controlled from the computer C.

The discharge from the screw conveyor 13, is via line 21, delivering sludge in the direction of arrow 22, to a sludge transverse screw conveyor 23, entering the same at location 24, such that the sludge is delivered through the conveyor 23 via a rotatably driven auger 25, driven from a motor 26 that, in turn is controlled by the computer C, via control line 27.

The sludge transverse screw conveyor 23 is disposed at an upward angle from end 28 to end 30 by means of supports 31 and 32, as shown. The supports 31 and 32, in turn, are mounted on respective load cells 33 and 34 that measure the weight of sewage sludge being delivered on a time basis, such as per minute, based upon increase of weight over time, for control of the amount of sewage sludge being delivered to the sludge/lime mixer from the conveyor 23 over any given time basis. This can be done by temporarily discontinuing the rotation of the auger 25 of the screw conveyor 23 to accumulate solids over time in the sludge/lime mixer 41 to establish a sludge/lime mixing rate.

The load cells 33 and 34 are connected to the computer C via electrical information communication lines 35 and 36, respectively.

The load cells 33 and 34, and any of the load cells used in connection with the system of this invention and/or its method of operation may be made in accordance with any of U.S. Pat. Nos. 5,770,823; 4,064,744; 4,166,997; 4,454,770 and 5,313,022, the complete disclosures of which are herein incorporated by reference.

Near the upper end 30 of the sludge transfer screw conveyor, there is a discharge opening 37, communicating with a duct 38, for delivering sewage sludge from the conveyor 23 via line 38, in the direction of the arrow 40, into the sludge/lime mixer 41, near the left end thereof as shown in FIG. 1. The sludge/lime mixer is essentially enclosed.

Lime is provided from a source such as a truck 45 delivered via a delivery line 46 to a lime silo 47, in which it resides until the programmable logic computer C calls for delivery of lime to the sludge/lime mixer 41. At that point, an openable discharge gate within the bottom 48 of the lime silo 47 is activated, to be opened via activation of a motor 50 via control line 51 from the computer C for delivery of lime via discharge line 52, as allowed by valve 53 controlled from the computer C via control line 54, to allow lime to flow into the lime feeder 55. An auger 56 within the lime feeder 55, delivers lime to lime feeder discharge line 57 upon controlled rotation of the auger 56 via motor 58, that, in turn, is controlled from the computer C via control line 60.

Lime thus passes downward from the delivery line 57 to the lime supply hopper 61, in the direction of the arrow 62.

The lime supply hopper 61, as shown, is essentially of tapered configuration, but it will be understood that the same can be of any configuration that will result in a satisfactory feed of lime to the lime feed screw conveyor 63.

The lime supply hopper is supported on supports 64, 65, that, in turn, are disposed on load cells 66, 67, respectively, which load cells 66, 67 transmit delivery weight over time information to the commuter C, via electrical information delivery lines 68, 70. Lime is thus delivered from the lower end 71 of the lime hopper, via delivery line 72, in the direction of the arrow 73, to the right-most end of the lime feed screw conveyor 63. An auger 74 running from end-to-end of the conveyor 63 therefore delivers lime leftward as shown in FIG. 1, due to rotational control of the auger 74 via motor 75 as controlled via control line 76 from the Computer C.

At the left-most end of the screw conveyor 63, there is shown an air intake line 77, for receipt of incoming air via an air impeller 78 disposed at the upper end thereof, which impeller 78 is driven via line 80 from a motor 81, which motor 81 is, in turn, controlled via electrical control line 82 from the computer C, for delivery of air through duct 77 in the direction of arrow 83, entering the lime feed screw conveyor at inlet 84.

Thus, lime and air enter a discharge duct 85 from the left-most end of the conveyor 74, in the direction of the arrow 86, to be delivered to the lime addition screw conveyor 87 at the left end thereof as shown in FIG. 1. The lime addition screw conveyor 87 likewise has an auger disposed therein from end-to-end (although only a portion thereof is illustrated schematically). The auger 88 is motor driven by motor 89, controlled via control line 91, from the computer C. The screw conveyor 87 is illustrated as having a plurality, such as five, potential lime discharge locations 90, at various locations along the screw conveyor 87. The left-most discharge location 90, is shown with a phantom connection to the lime/sludge mixer, which phantom connection appears as 93. The center two of the discharge locations 92 are not illustrated as having any connection to the sludge/lime mixer 41, and the right-most connections from the lime addition screw conveyor 87 to the sludge/lime mixer 41 are shown at 93. It will be understood that any of the discharge locations 92 from the lime addition screw conveyor may have suitable connections to the sludge/lime mixer 41 located as may be desired.

Sometimes a greater amount of mixing within the mixer 41 is desired, in which case, one of the left-most connections 93 will be installed. Other times a lesser amount of mixing of lime is needed, at which point one or more of the more rightward located connections 93 will be employed.

Figure 1A:
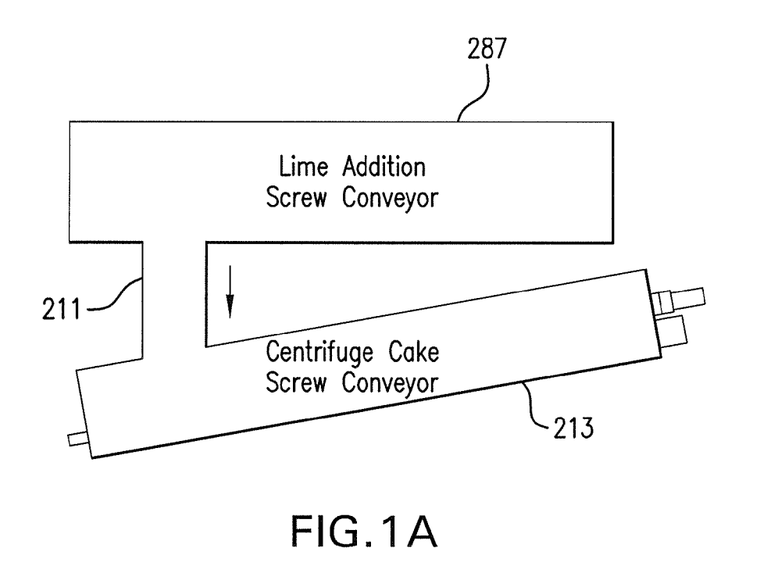
FIG. 1A is a schematic alternative delivery system for delivering lime from the lime addition screw conveyor to the centrifuge cake screw conveyor.

Thus, lime is supplied to the sludge/lime mixer 41 under controlled supplying conditions. As an alternative to the delivery of lime from the lime addition screw conveyor 87 to the sludge/lime mixer 41, lime can be supplied to the centrifuge cake screw conveyor 213, prior to increasing the solids concentration of the sludge. Thus, as shown schematically in FIG. 1A, lime is delivered from a lime addition screw conveyor 287 to a centrifuge cake screw conveyor 213, prior to increasing the solids concentration of the sludge.

Within the sludge/lime mixer 41, there is an augers 95, schematically illustrated, but running from the left end to the right end of the mixer 41, such that delivery of sludge into the mixer 41 via delivery line 38, and delivery of lime and air from the lime addition screw conveyor 87 enters the sludge/lime mixer 41 via any or all of inlet lines 93, depending upon which lines 93 have been chosen to be the sources of air and lime delivery into the mixer 41, depending upon the amount of mixing of lime with the sludge is desired.

The rotation of the augers 95 is controlled from motor 96 via control line 97, that, in turn, is controlled from the computer C.

The sludge/lime mixer 41 sits on load cells 100, 101 that are responsive to the weight of sludge and lime being mixed in the mixer 41, and deliver that information via respective electrical information delivery lines 102, 103 to the programmable logic computer C.

A heating device, preferably comprising an electrical heater 104, is located inside the sludge/lime mixer, for supplying heat thereto, to heat the sludge and lime in the mixer 41, especially at the location of inlet 38 of sludge thereto, with the heating element 104 being controlled from the programmable computer C, via electrical lines 105, 106. The computer C is provided with electric power via power supply 79. Alternatively, instead of electrical heater 104, heat can be provided to either the conveyor 41 or the auger 95 by the use of a hot oil or hot gas heating means, as may be desired.

Alternatively, or in addition thereto, the heat may be provided via a methane heater 107, for example, or any other type of heater that would heat a thermal fluid such as hot oil or hot gas delivered thereto from a thermal fluid supply 108, via delivery line 110, for recirculation of the thermal fluid to and from the inside of the sludge/lime mixer, such as, but not limited to, through the augers 95 via thermal fluid lines 111 and 112.

The delivery and use of heated thermal fluid from the fluid heater 107 may be as is disclosed in any of U.S. Pat. Nos. 7,669,348 and 8,065,815, the complete disclosures of which are herein incorporated by reference.

The augers 95 within the sludge/lime mixer may be constructed in accordance with the opposed screw augers in the mixing chamber of U.S. Pat. No. 5,401,402, the complete disclosure of which is herein incorporated by reference, or in any other manner such as will satisfactorily convey and mix the sludge and lime in the mixer 41.

The sludge/lime mix is thus delivered to the right end of the sludge/lime mixer 41, for discharge therefrom via discharge line 113, in the direction of the arrow 114 to a transfer conveyor 115. The transfer conveyor may be a belt conveyor, suitably motor driven from a motor 116 thereof (see FIG. 2) that in turn in controlled via a motor control 117 that, in turn, is controlled from the computer C via electrical control line 118.

The transfer conveyor 115 is contained within a substantially completely enclosed enclosure 120, with the exception of the inlet for the sludge/lime mix at inlet 113, in order to maintain control of odors, steam, dust or any ammonia resultant from the treatment process from entering the atmosphere prior to cleaning the same through a control hood, scrubber and discharge stack, as will be discussed hereinafter with respect to FIG. 2.

Figure 2:
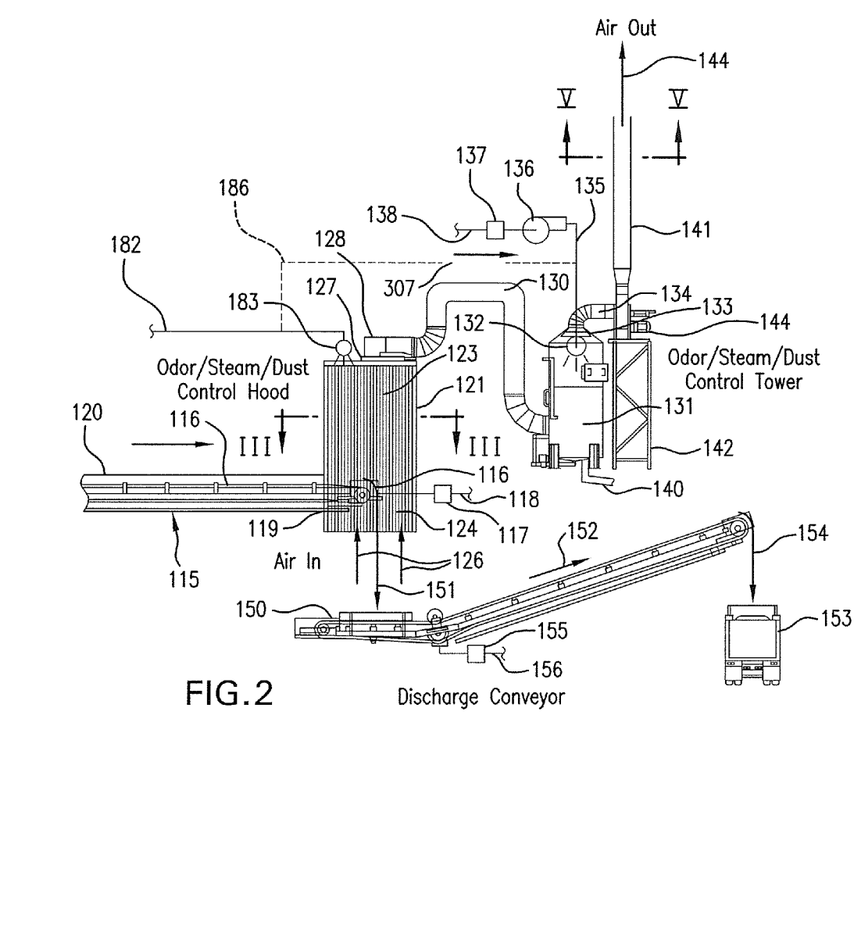
FIG. 2 is a continuation of the schematic of FIG. 1, from the transfer conveyor, to the hood for removal of odors, steam, dust and any ammonia and delivery of the same through a wet scrubber and out the discharge stack of a control tower, to the environment, with the sludge being delivered from the substantially enclosed transfer conveyor to discharge.

It will be apparent that the transfer conveyor 115 is shown in two parts, one part in FIG. 1 and the remainder in FIG. 2, via a drafting expedient breaking the same in parts, due to the length of the system which appears in part in FIG. 1 and in part in FIG. 2.

After the sewage sludge has been stabilized with lime in the sludge/lime mixer and deposited onto the transfer conveyor 115, it is delivered into the lower end of a control hood 121 as shown in FIG. 2, by which the sludge/lime mix enters the hood 121 through an opening 119 on the left side thereof.

Figure 3:
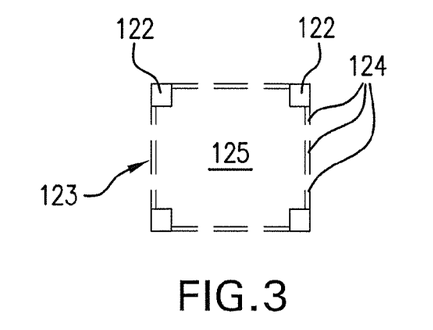
FIG. 3 is a horizontal sectional view taken generally along the line III-III of FIG. 2, wherein a curtain type enclosure is illustrated, for receiving air at the lower end through the curtained enclosure, for delivery to a wet scrubber.

The hood 121, as illustrated in FIGS. 2 and 3, it is comprised of four corner supports 122 and a curtain 123, which curtain 123 is preferably comprised of a generally flexible material. The curtain 123 may preferably be comprised of a plurality of vertical strips 124 of plastic sheeting, on each of the four sides of the hood 121, which, in the aggregate, form an enclosure at the periphery of the hood 121 around the interior 125 of the hood 121. The vertical strips 124 may be of transparent plastic, and, in the aggregate, will allow ingress of air through the curtain 123.

Air will also be drawn upwardly through the interior 125 of the hood 121 in the direction of the arrows 126, by creating a low pressure zone from above the hood 121, as will be described hereinafter.

Air is drawn through the hood 121 by means of an exhaust connection 128 in the top 127 of the hood 121 of a duct 130 connected to an air scrubber 131. The scrubber 131 is provided with one or more spray nozzles 132 therein, for spraying water into the upper end of the scrubber 131 to create liquid droplets that will absorb dust, odor, steam, ammonia, and any combinations thereof that are entrained within or carried by the air drawn through the scrubber 131. A mist eliminator 133 is disposed at the upper end of the scrubber 131 to prevent such droplets or spray from being drawn upwardly out of the scrubber 131 through the scrubber outlet duct 134. The scrubber may be made in accordance with any of U.S. Pat. Nos. 3,969,094; 4,539,024 and 5,292,353 or in any other manner. Water is delivered to the one or more spray nozzles 132 in the scrubber 131 via a delivery line 135, preferably under pressure provided, as by a pump 136, controlled by a motor 137 that, in turn, is controlled via an electrical control line 138 from the programmable logic computer C. Droplets that dissolve or absorb the dust, odor particles, steam, ammonia or other impurities are collected at the bottom of the scrubber 131 and may be discharged therefrom via the liquid discharge line 140. It will thus be seen that pollutants are removed from the air entering the scrubber 131.

The thus purified air passes through the scrubber discharge duct 134 to enter the bottom of a stack 141 that is supported on a stack support tower 142.

Figure 5:
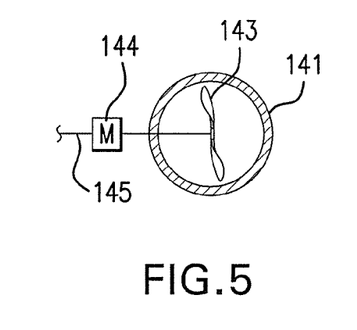
FIG. 5 is a sectional view taken along line V-V of FIG. 2, through the purified air discharge stack, wherein a means for withdrawing air through the stack is illustrated.

A fan, impeller or other air movement device 143 is located in the stack 141, as shown in the cross-section of FIG. 5, for creating air flow up through the stack 141, and drawing a partial vacuum through the scrubber 131, the duct 130, and hood 121 in the direction of the arrow 144. The impeller or other such partial vacuum drawing device 143 is driven by a motor 144 having an electrical control line 145, controlled by the programmable logic computer C.

The stabilized sludge/lime mix is deposited from the transfer conveyor 115 onto a discharge conveyor 150, dropping from the right end of the transfer conveyor 115 as illustrated in FIG. 2, down onto the discharge conveyor 150 in the direction of the arrow 151, to pass in the direction of the arrow 152, up the discharge conveyor, to be delivered to a truck 153, dropping into the truck 153 as shown by the arrow 154. The truck 153 can then deliver the thus treated sludge to another location, such as for distribution onto land or the like.

Figure 6:
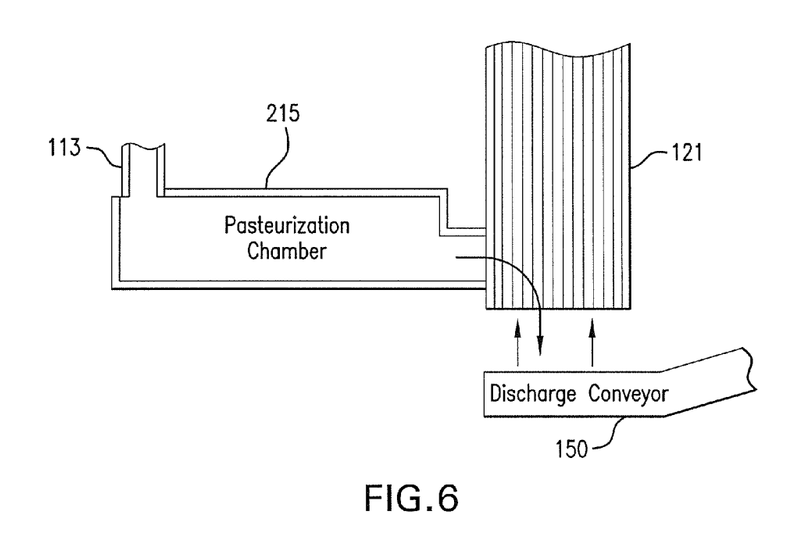
FIG. 6 is an alternative to the substantially enclosed transfer conveyor of FIGS. 1 and 2, whereby the sludge/lime mix is delivered from the sludge/lime mixer to a pasteurization chamber prior to discharge to a discharge conveyor.

As an alternative to delivery of the sludge/lime mix from the sludge/lime mixer 41 to the transfer conveyor 115, the sludge/lime mix can be delivered via line 113 to a pasteurization vessel 215 prior to discharge to the discharge conveyor 150, with air being drawn off via the hood 121 as described above. The pasteurization vessel can be as described in U.S. Pat. No. 5,783,073, the complete disclosure of which is herein incorporated by reference, or via any other suitable pasteurization vessel.

The discharge conveyor is driven by a motor 155 that, in turn, is controlled from the programmable logic computer C, via an electrical control line 156.

Figure 4:
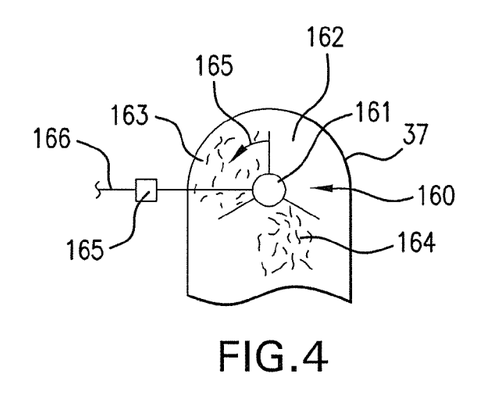
FIG. 4 is a sectional view taken along the line IV-IV of FIG. 1, illustrating volumetric control of sewage sludge being delivered to the sludge/lime mixer.

While the transfer of untreated sludge from the sludge transfer conveyor 23 to the sludge/lime mixer 41 will preferably be controlled by controlling the weight of sludge delivered from the sludge transfer screw conveyor by means of the load cells 33, 34, there is provided an alternative or additional volumetric control of sludge passing from the sludge transfer screw conveyor 23 to the sludge/lime mixer 41. With reference to FIG. 4, there is shown, in the discharge 37 of the sludge transfer screw conveyor 23, a means for controlling the volume of sludge passing through the discharge 37, by means of a volumetric feeder 160, shaft-driven at 161, with the volumetric feeder being comprised of three pockets 162, 163 and 164, substantially equidistantly spaced apart, so that, upon rotation of the shaft 161 in the direction of the arrow 165, as shown, untreated sewage sludge from the transfer screw conveyor 23 will enter the pockets 162-164 to be rotatingly moved downward so that the sewage sludge falls through the duct or conduit 38 into the sludge/lime mixer 41.

It will be understood that other forms of volumetric feeder other than that 160 may be used, within the scope of this invention, and that the sludge delivery apparatus could comprise a structure other than the auger 35, such as a moving belt, a paddle conveyor, or any other sludge delivery apparatus.

The motor 165 that drives the shaft 161 is controlled via an electrical control line 166, controlled by the programmable logic computer C.

A system is provided for dissolving scale that accrues to surfaces in the system as a result of exposure of those surfaces to lime. In accordance therewith, at the right side of the schematic of FIG. 1, there is shown a vessel 170 containing an acid 171. A source 172 of water is also provided for the vessel 171, so that either acid 171 or water via supply line 172 is provided to the vessel 170, or combinations thereof. A pump 173 with a suction line 174 is provided into the vessel 170, for delivering acid or water, or both via line 175 to spray devices (unnumbered) in any of the discharges 92 from the lime addition screw conveyor 87, to pass through any of the desired appropriate delivery ducts 93, into the sludge/lime mixer 41. The pump 173 is controlled from a motor 176 that, in turn, is controlled from an electrical control line 177 from the computer C. Similarly, a pump 180 has a suction line 181 in the vessel 170, for drawing acid, water, or combinations thereof via line 182 to the hood 121 via suitable spray nozzles 183, and optionally to the spray nozzles 132 in the scrubber 131, via line 135 and pump 136. The programmable logic computer C can likewise control the operation of the motor 183 for delivery of acid and/or water and/or other scale dissolving chemicals. from the vessel 170, via the electrical control line 184, connected thereto.

The delivery of acid and/or water can be provided from the vessel 170 to the scrubber 131, via the optional connection line 186 shown in dotted, connecting delivering line 182 with delivery line 135, as shown in FIG. 2.

It will be apparent from the foregoing that various modifications may be made in the apparatus and method of this invention all within the spirit and scope of the invention as defined in the appended claims. Where structure is recited in means plus function language or steps plus function language, it will be understood that the same is to be of the broadest possible scope, embodying not only the particular apparatus or steps set forth in the claims hereof, but also all equivalents thereof that would be within the scope and understanding of those skilled in this art, whether or not such are specifically disclosed in this application.

What is claimed is:

1. A precision lime stabilization system for treatment of sewage sludge therein, comprising:
   (a) means for increasing the solids concentration of the sludge;
   (b) means for transferring the concentrated sludge to a sludge/lime mixer;
   (c) means for supplying lime from a lime supply or from a means for feeding lime under controlled supplying conditions;
   (d) means for feeding lime from the means for supplying lime to the sludge/lime mixer under any one of the following sequence conditions:
      (i) after increasing the solids concentration of the sludge; and
      (ii) prior to increasing the solids concentration of the sludge;
   (e) means for mixing the lime and sludge in the sludge/lime mixer to create a sludge/lime mix and to raise the pH of the sludge/lime mix to a range of about 10 to about 12.5;
   (f) means for heating the sludge/lime mix to drive off volatiles from the mix;
   (g) with the sludge/lime mixer being substantially enclosed;
   (h) means providing a forced air draft to the sludge/lime mixer to prevent steam resulting from the means for heating the sludge/lime mix from backing up to the lime supply;
   (i) means for transferring the sludge/lime mix from the sludge/lime mixer to a discharge station via a transfer apparatus;
   (j) means for capturing air containing any of dust, odors, steam, ammonia and any combinations of any of them from the discharge station that result from the sludge treatment and for cleaning the air and discharging the cleaned air to atmosphere.

2. The system of claim 1, wherein the means of clause (a) comprises screw conveyor means.

3. The system of claim 1, wherein the means of clause (b) comprise screw conveyor means and a delivery duct.

4. The system of claim 1, wherein the means of (c) comprise a lime containing silo, a lime feeder from the silo to a lime supply hopper, and a lime supply hopper for receiving lime from the lime feeder.

5. The system of claim 1, wherein the means of clause (d) comprise at least one lime feed screw conveyor connected to the sludge/lime mixer for delivering lime to the mixer.

6. The system of claim 1, wherein the means of clause (e) comprise at least one variable speed mixing auger.

7. The system of claim 1, wherein the means of clause (f) comprises any of:
   (i) means for heating an auger in the mixer for heat transfer to the sludge and lime in the mixer;
   (ii) electric means for heating the sludge entering the mixer;
   (iii) hot oil means for heating the sludge; and
   (iv) hot gas means for heating the sludge.

8. The system of claim 1, wherein the means of clause (g) comprises a generally horizontally disposed mixer with access means only for receiving sludge, lime and air thereto and egress means for discharging sludge/lime mix therefrom during the mixing of sludge and lime therein.

9. The system of claim 1, wherein the means of clause (h) comprise impeller means.

10. The system of claim 1, wherein the means of clause (i) comprise any one of
    (i) a substantially enclosed transfer apparatus; and
    (ii) a pasteurization vessel.

11. The system of claim 1, wherein the means of clause (j) comprise a hood at the discharge station, a means for drawing air into the hood, a scrubber for receiving air from the hood and for scrubbing any of dust, odor, ammonia or steam from air in the scrubber, and a tower for receiving scrubbed air from the scrubber and discharging scrubbed air to the environment.

12. The system of claim 1, including a computer and gravimetric load cells means connected to the computer for measuring the weight of sludge and lime being delivered to the sludge/lime mixer and the weight of sludge/lime mix in the sludge/lime mixer and for continuously controlling the delivery of sludge and lime to the mixer.

13. The system of claim 1, including a computer and volumetric means connected to the computer for determining the volume of sludge and lime being delivered to the sludge/lime mixer and the volume of sludge/lime mix in the sludge/lime mixer and for controlling the delivery of sludge and lime to the mixer.

14. The system of claim 1, including means for dissolving scale that accrues to surfaces in the system resulting from exposure of surfaces in the system to lime, including means for delivery of any of:
    (i) acid;

(ii) water;
(iii) combinations of acid and water to surfaces in the system; and
(iv) other scale dissolving chemicals.

15. The system of claim 14, wherein the means for dissolving scale is connected to the sludge/lime mixer.

16. The system of claim 11, including means for dissolving scale that accrues to surfaces in the system resulting from exposure of surfaces in the system to lime, including means for delivery of any of:
(i) acid;
(ii) water; and
(iii) combinations of acid and water to surfaces in the system; and
(iv) other scale dissolving chemicals;
wherein the means for dissolving scale is connected to any of:
(i) the hood;
(ii) the scrubber;
(iii) the sludge/lime mixer; and
(iv) any combinations of any of the hood, scrubber and sludge/lime mixer tower.

17. The system of claim 14, including a computer and control means connecting the means for dissolving scale to the computer, for computer control of the means for dissolving scale.

18. The system of claim 1, wherein the means of clause (a) comprises screw conveyor means; wherein the means of clause (b) comprise screw conveyor means and a delivery duct; wherein the means of (c) comprise a lime containing silo, a lime feeder from the silo to a lime supply hopper, and a lime supply hopper for receiving lime from the lime feeder; wherein the means of clause (d) comprise at least one lime feed screw conveyor connected to the sludge/lime mixer for delivering lime to the mixer; wherein the means of clause (e) comprise at least one variable speed mixing auger; wherein the means of clause (f) comprises any of:
(i) means for heating an auger in the mixer for heat transfer to the sludge and lime in the mixer;
(ii) electric means for heating the sludge entering the mixer;
wherein the means of clause (g) comprises a generally horizontally disposed mixer with access means only for receiving sludge, lime and air thereto and egress means for discharging sludge/lime mix therefrom during the mixing of sludge and lime therein; wherein the means of clause (h) comprise impeller means; wherein the means of clause (i) comprise a substantially enclosed transfer apparatus; wherein the means of clause (j) comprise a hood at the discharge station, a means for drawing air into the hood, a scrubber for receiving air from the hood and for scrubbing any of dust, odor, ammonia or steam from air in the scrubber, and a tower for receiving scrubbed air from the scrubber and discharging scrubbed air to the environment; including a computer and gravimetric load cells means connected to the computer for measuring the weight of sludge and lime being delivered to the sludge/lime mixer and the weight of sludge/lime mix in the sludge/lime mixer and for continuously controlling the delivery of sludge and lime to the mixer; including means for dissolving scale that accrues to surfaces in the system resulting from exposure of surfaces in the system to lime, including means for delivery of any of:
(iii) hot oil means for heating the sludge; and
(iv) hot gas means for heating the sludge;
(i) acid;
(ii) water; and
(iii) combinations of acid and water to surfaces in the system; and
(iv) other scale dissolving chemicals;
wherein the means for dissolving scale is connected to the sludge/lime mixer;
wherein the means for dissolving scale is connected to any of:
(i) the hood;
(ii) the scrubber;
(iii) the sludge/lime mixer; and
(iv) any combinations of any of the hood, scrubber and sludge/lime mixer;
including a computer and control means connecting the means for dissolving scale to the computer, for computer control of the means for dissolving scale.

19. A method of precision lime stabilization system for treatment of sewage sludge therein, comprising:
(a) increasing the solids concentration of the sludge;
(b) transferring the concentrated sludge to a sludge/lime mixer;
(c) supplying lime from a lime supply or from a means for feeding lime under controlled supplying conditions;
(d) feeding lime from the means for supplying lime to the sludge/lime mixer under any one of the following sequence conditions:
(i) after increasing the solids concentration of the sludge; and
(ii) prior to increasing the solids concentration of the sludge;
(e) mixing the lime and sludge in the sludge/lime mixer to create a sludge/lime mix and to raise the pH of the sludge/lime mix to a range of about 10 to about 12.5;
(f) heating the sludge/lime mix to drive off volatiles from the mix;
(g) keeping the sludge/lime mix in the sludge/lime mixer substantially enclosed;
(h) providing a forced air draft to the sludge/lime mixer to prevent steam resulting from heating the sludge/lime mix from backing up to the lime supply;
(i) transferring the sludge/lime mix from the sludge/lime mixer to a discharge station via either a transfer apparatus or a pasteurization chamber;
(j) capturing air containing any of dust, odors, steam, ammonia and any combinations of any of them from the discharge station that result from the sludge treatment and for cleaning the air and discharging the cleaned air to atmosphere.

* * * * *